US005655504A

United States Patent [19]

Iwai

[11] Patent Number: 5,655,504

[45] Date of Patent: Aug. 12, 1997

[54] FUEL SUPPLYING APPARATUS AND PRESSURE REGULATOR

[75] Inventor: Shingo Iwai, Hiroshima, Japan

[73] Assignee: Mitsubishi Denki Kabushiki Kaisha, Tokyo, Japan

[21] Appl. No.: 426,652

[22] Filed: Apr. 21, 1995

[30] Foreign Application Priority Data

Apr. 22, 1994 [JP] Japan .................................... 6-084266

[51] Int. Cl.[6] ............................ F02M 37/00; F16K 17/04

[52] U.S. Cl. ............................................ 123/511; 123/514

[58] Field of Search .................................... 123/497, 509, 123/510, 511, 514, 457, 459; 137/115, 588, 515, 565, 569; 417/307

[56] References Cited

U.S. PATENT DOCUMENTS

| | | | |
|---|---|---|---|
| 4,310,289 | 1/1982 | Merz | 417/307 |
| 4,502,445 | 3/1985 | Roco-Nierga et al. | 123/459 |
| 4,503,885 | 3/1985 | Hall | 137/569 |
| 4,557,287 | 12/1985 | Laufer | 137/615 |
| 4,844,704 | 7/1989 | Jiro | 417/307 |
| 5,148,792 | 9/1992 | Tuckey | 123/497 |
| 5,263,459 | 11/1993 | Talaski . | |
| 5,284,120 | 2/1994 | Fukushima et al. | 123/497 |
| 5,289,810 | 3/1994 | Bauer et al. | 123/514 |
| 5,361,742 | 11/1994 | Briggs et al. | 123/514 |
| 5,373,829 | 12/1994 | Schuers et al. | 123/510 |
| 5,390,692 | 2/1995 | Jones et al. | 123/506 |
| 5,398,655 | 3/1995 | Tuckey | 123/514 |
| 5,435,344 | 7/1995 | Robinson et al. | 123/514 |
| 5,435,345 | 7/1995 | Robinson et al. | 123/514 |

FOREIGN PATENT DOCUMENTS

| | | |
|---|---|---|
| 0 280 923 | 9/1988 | European Pat. Off. . |
| 0 423 636 | 4/1991 | European Pat. Off. . |
| 0 491 522 | 6/1992 | European Pat. Off. . |
| 1 570 162 | 6/1969 | France . |
| 27 05 083 | 8/1978 | Germany . |
| 44 31 996 | 3/1995 | Germany . |
| 59-170466 | 9/1984 | Japan . |
| 60-116852 | 6/1985 | Japan . |
| 64-6470 | 1/1989 | Japan . |
| 21 53 253 | 6/1990 | Japan . |
| 62 07 564 | 7/1994 | Japan . |

*Primary Examiner*—Thomas N. Moulis
*Attorney, Agent, or Firm*—Burns, Doane, Swecker & Mathis, LLP

[57] ABSTRACT

A pressure regulator includes a case having a fuel inlet port for receiving fuel from a fuel pump, a fuel outlet port for delivering fuel to an internal combustion engine, and an opening. A valve element is attached to an elastic diaphragm that closes the opening. The valve element has a discharge passage for discharging excess fuel by allowing the interior and the exterior of the case partitioned by the elastic diaphram to communicate with each other. A spring seat is provided in the case in face-to-face relation to the valve element in such a manner as to close the discharge passage of the valve element during pressure contact. A spring is also provided for bringing the valve element into pressure contact with the valve seat with a predetermined pressure.

13 Claims, 7 Drawing Sheets

FUEL SUPPLYING APPARATUS AND PRESSURE REGULATOR

FIELD OF THE INVENTION

The present invention relates to a fuel supply system, and more particularly to a fuel supplying apparatus and pressure regulator for supplying fuel to an internal combustion engine.

BACKGROUND OF THE INVENTION

FIGS. 10 and 11 depict a conventional fuel supplying apparatus and a conventional pressure regulator shown in, for instance, Japanese Utility Model Application Laid-Open No. 6470/1989. As seen in FIG. 10, a pressure regulator 101' is installed in the engine compartment of a vehicle. A check valve 104' is disposed in a discharge port of a fuel pump 103' that is positioned in a fuel tank 102' containing fuel 108'. A pressure regulation passage 105' is provided through which the fuel discharged from' the fuel pump 103' flows, the fuel being subjected to pressure regulation by the pressure regulator 101'. An injector 106' is disposed in the pressure regulation passage 105' for supplying fuel to the engine. Excess fuel is returned to the fuel tank 102' by way of a return passage 107'.

As Seen in the cross-sectional view of FIG. 11, the pressure regulator 101' includes a case 1' and a fuel inlet port 2' which is an inlet port for pressurized fuel supplied from the fuel pump 103'. An excess-fuel passage 3' is used as a fuel outlet port for returning excess fuel during pressure regulation back to the fuel tank 102'. The regulator 101' also includes a cover 4', a pressure regulating spring 5' disposed in the cover 4', a diaphragm 6', a diaphragm support 7', and a spring seat 8' for clamping the diaphragm 6' together with the diaphragm support 7'. A valve portion 9' has a spherically shaped proximal portion that is fitted in the diaphragm support 7', and a valve seat 10' is adapted to perform a known valving operation as the valve portion 9' is brought into contact therewith during pressure regulation.

The conventional fuel supplying apparatus and pressure regulator are arranged as described above. The fuel 108' which is sucked and pressurized by the fuel pump 103' pushes open the check valve 104', passes through the pressure regulation passage 105', and is supplied from the fuel inlet port 2' of the pressure regulator 101' into the case 1'. When the pressure of the fuel within the case 1' reaches a pressure level which can be controlled by the pressure regulating spring 5', the diaphragm support 7' is pushed upward in cooperation with the flexibility of the diaphragm 6' against the pressure regulating spring 5'. Accordingly, the valve portion 9' is moved away from the valve seat 10', opens the excess fuel passage 3', and allows excess fuel to return to the fuel tank 102', thereby effecting the pressure regulation of the pressure regulation passage 105'.

The pressure regulator 101' of this type must be disposed downstream of the injector 106' in the pressure regulation passage 105', and the passage shutting-off performance of the valve portion 9' must be increased to secure a pressure maintaining function. For this reason, the proximal part of the valve portion 9' is formed by a ball to improve the shutting performance between the valve portion 9' and the valve seat 10'. Accordingly, even if the fuel pressurized by the fuel pump 103' is stopped, the passage is shut off by the pressure regulator 101' and the check valve 104', and the pressure within the pressure regulation passage 105' is maintained.

With the above-described conventional fuel supplying apparatus and pressure regulator, the pressure regulator 101' is disposed at a position within the engine compartment where the temperature becomes high, and the excess fuel Which has been pressure-regulated by the pressure regulator 101' returns through the return passage 107' to the fuel tank 102' via a high-temperature section. This has caused problems with respect to increased fuel temperature and the generation of large amounts of bubbles, thereby causing a decline in the efficiency of the fuel pump.

In addition, the pressure regulator 101' must be disposed downstream of the injector 106' in the pressure regulation passage 105', thereby requiring long metal piping for returning the excess fuel from the pressure regulator 101' to the fuel tank 102'.

Furthermore, when the engine is stopped and the supply of fuel from the fuel pump is stopped, the valve portion must possess good shutting performance characteristics to maintain pressure. This complicates the structure of the pressure regulator 101' so that the pressure regulator 101' cannot be made compact.

SUMMARY OF THE INVENTION

The present invention has been devised to overcome the above-described problems, and provides a fuel supplying apparatus which does not cause a rise in the fuel temperature within the fuel tank. This is accomplished by directly returning the excess fuel from the pressure regulator to the fuel tank without passing through a high-temperature section including the engine.

The present invention also provides a fuel supplying apparatus which eliminates the piping in the return passage for returning the excess fuel from the pressure regulator disposed in the engine compartment to the fuel tank.

The present invention additionally involves a fuel supplying apparatus which can be installed in a thin-type fuel tank whose height is low, such that the fuel supplying apparatus can be attached to the underside or the like of a vehicle trunk compartment.

The present invention further provides a fuel supplying apparatus which makes it possible to prevent a sudden decline in fuel pressure at the injector inlet when the amount of fuel consumption by the engine has increased and a large amount of fuel is injected from the injector into the engine.

The present invention also involves a pressure regulator having excelled pressure-regulating performance by making lightweight the valve element attached to an elastic diaphragm, thereby increasing the operating speed of the valve element.

The present invention also provides a pressure regulator in which when the amount of fuel consumption by the engine is small and the amount of excess fuel is large, a spring chamber is set under a negative pressure by causing a jet pump action to occur as a result of the Venturi effect between an inner cylinder of the cover and an outer cylinder of the discharge passage. This negative pressure causes the valve element to operate in the direction in which the pressure regulating spring is compressed so as to increase the gap of the valve element thereby alleviating the burden on the fuel pump.

The present invention additionally involves a pressure regulator in which the valve element is not liable to be adversely affected by lateral pressure due to the flow of the fuel being supplied from the fuel pump under pressure.

Furthermore, the present invention provides a fuel supplying apparatus and a pressure regulator which allow fuel to be transferred easily from a tank in which the fuel pump is not disposed to a tank in which the fuel pump is disposed by making use of negative pressure due to the jet pump action in, for instance, a two-tank type fuel tank mounted in a four-wheel-drive vehicle.

The fuel supplying apparatus in accordance with the present invention supplying fuel from a fuel pump disposed in a fuel tank to an internal combustion engine. The apparatus includes a check valve for preventing the reverse flow of fuel between the internal combustion engine and the fuel pump, and a pressure regulator for regulating the pressure of fuel being supplied between the check valve and the fuel pump.

Also, the pressure regulator is attached to the fuel pump integrally therewith. The pressure regulator can be attached to a side of the fuel pump.

Further, an auxiliary pressure device for compensating for a decline in fuel pressure in the supplying passage is provided in the fuel supplying passage in the vicinity of the internal combustion.

The pressure regulator in accordance with the present invention includes a case having a fuel inlet port adapted to be connected to a fuel pump, a fuel outlet port adapted to be connected to an internal combustion engine, and an opening. The pressure regulator also includes a valve element attached to an elastic diaphragm for closing the opening, and a discharge passage for excess fuel formed to allow an interior and an exterior of the case partitioned by the elastic diaphragm in a center thereof to communicate with each other. Additionally, a spring seat is provided in the case in face-to-face relation to the valve element in such a manner as to close the discharge passage of the valve element during pressure contact of the valve element, and a spring is provided for bringing the valve element into pressure contact with the valve seat with a predetermined pressure.

In addition, the pressure regulator comprises an outer cylinder of a valve element extending in an outward direction of the case along the discharge passage of the valve element of the pressure regulator, and a cover attached in such a manner as to cover an outer side of the opening of the case and having a hat-shaped configuration. A central portion of the top of the cover forms an inner cylinder which opens toward an inner side thereof, and the outer cylinder of the valve element is inserted into the inner cylinder of the cover with a movable or variable very small gap therebetween.

Furthermore, the contact surface of the valve element and the valve seat are arranged in parallel with the fuel passage leading from the fuel inlet port to the fuel outlet port.

Moreover, the fuel pump is installed in one tank of a fuel tank having at least a portion which is separated into two tanks. The other fuel tank and the interior of the cover communicate with each other by means of a capillary tube.

In the fuel supplying apparatus in accordance with the present invention, when the engine is stopped and the fuel supply from the fuel pump is stopped, the check valve maintains fuel pressure in the pressure regulation passage between the pressure regulator and the engine. In addition, since the pressure regulator can be installed integrally with the fuel pump, the excess fuel discharged from the pressure regulator can be returned directly to the fuel tank without using a return passage.

In the pressure regulator in accordance with the present invention, fuel is supplied from the fuel inlet port to the fuel outlet port under a fixed pressure. If the fuel pressure increase, excess fuel is returned to the tank through the discharge passage, thereby maintaining the pressure at a fixed level. In addition, a jet pump is formed at a gap between the inner cylinder of the cover and the outer cylinder of the valve element by the jet of excess fuel, so as to increase the amount of regulation pressure.

DESCRIPTION OF THE PREFERRED EMBODIMENTS

First Embodiment

Figure 1:
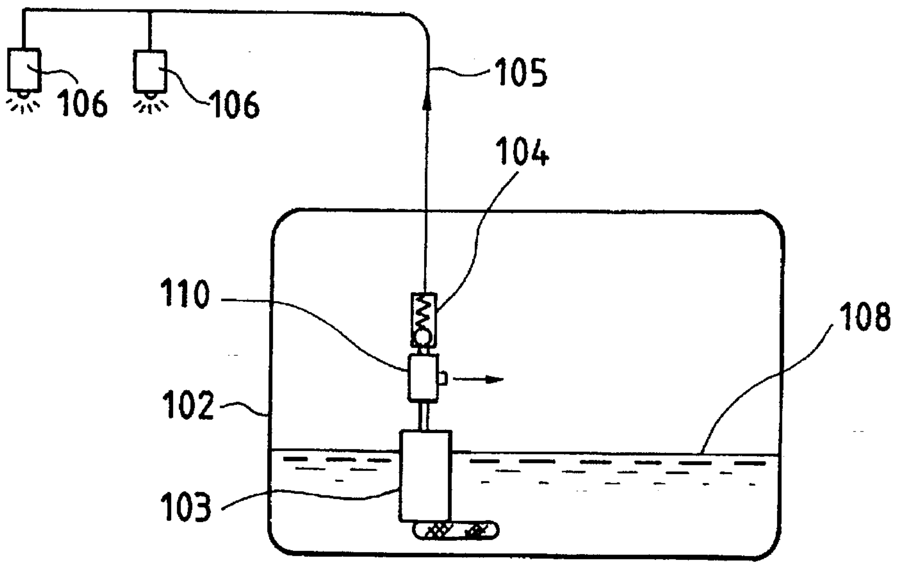
FIG. 1 is a system diagram of a fuel supplying apparatus illustrating a first embodiment of the present invention.
Figure 10:
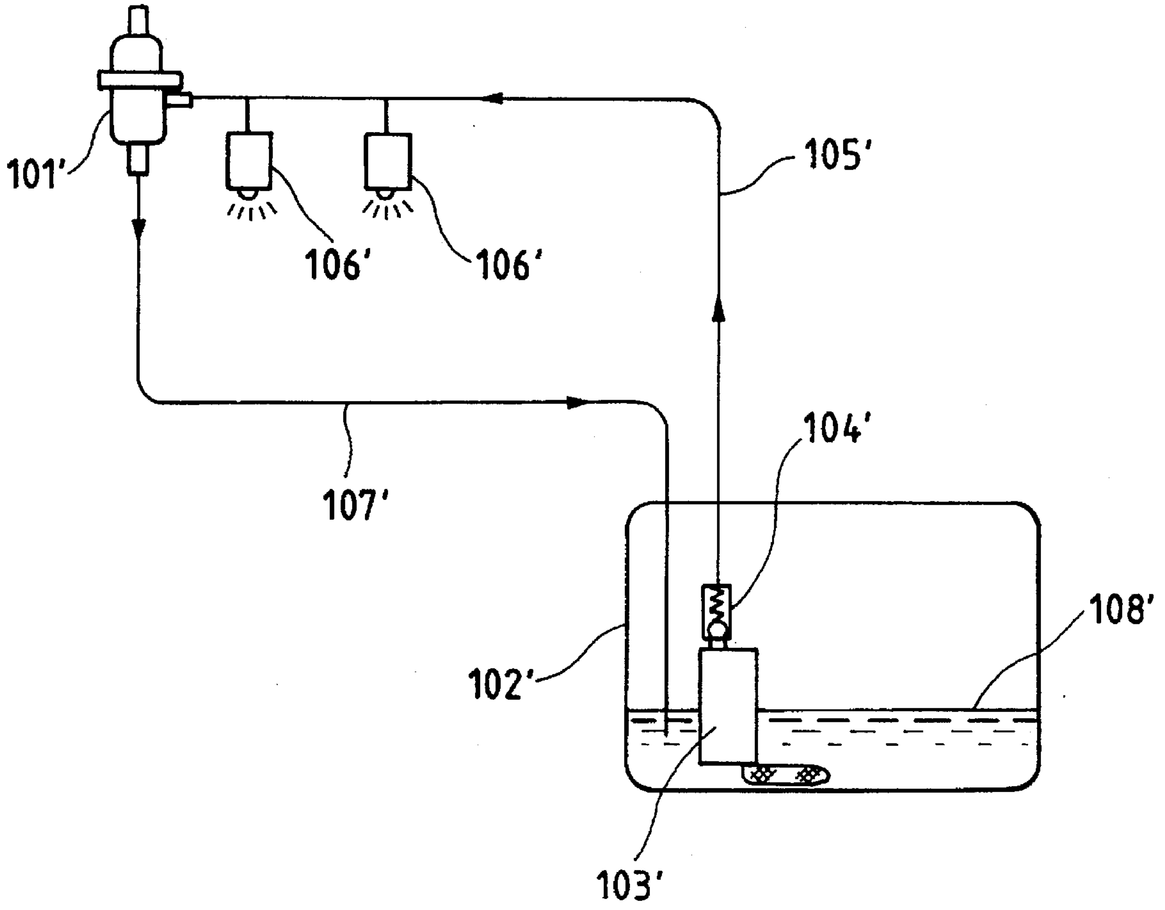
FIG. 10 is a system diagram illustrating a conventional fuel supplying apparatus.
Figure 11:
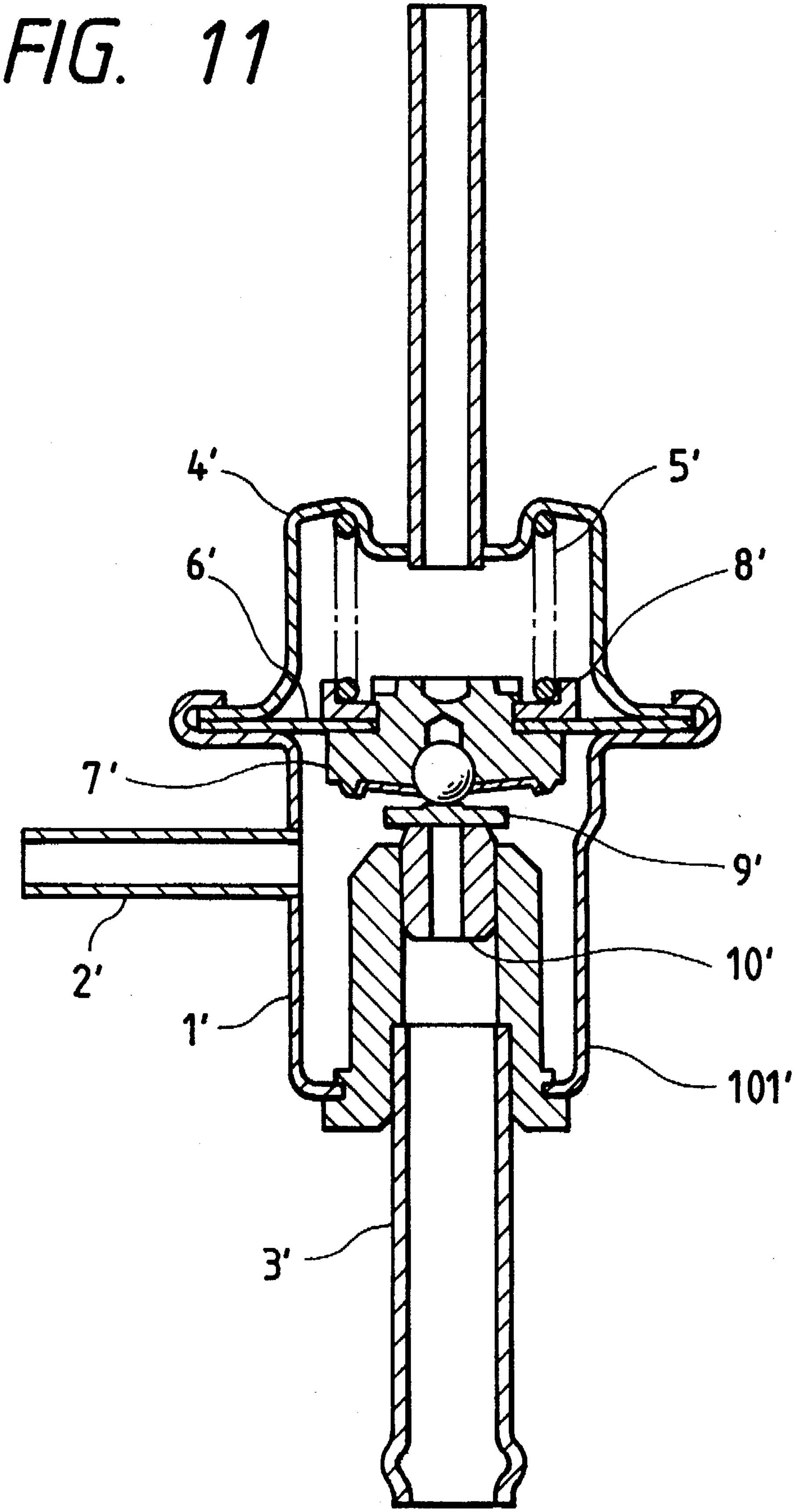
FIG. 11 is a cross-sectional view illustrating a conventional pressure regulator.
Figure 7:
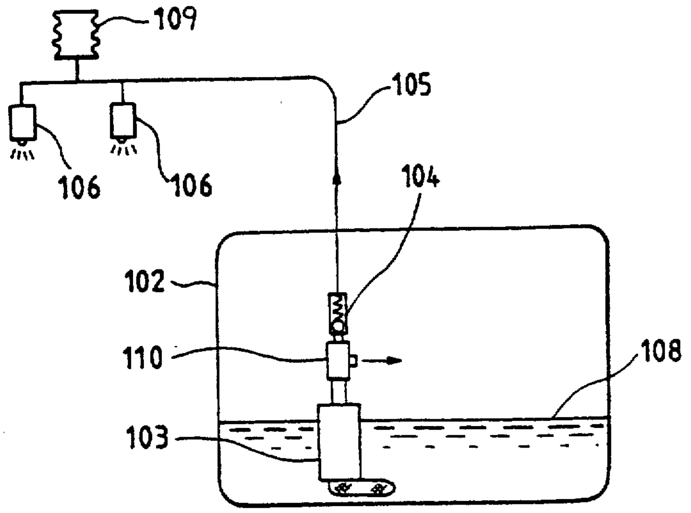
Figure 8:
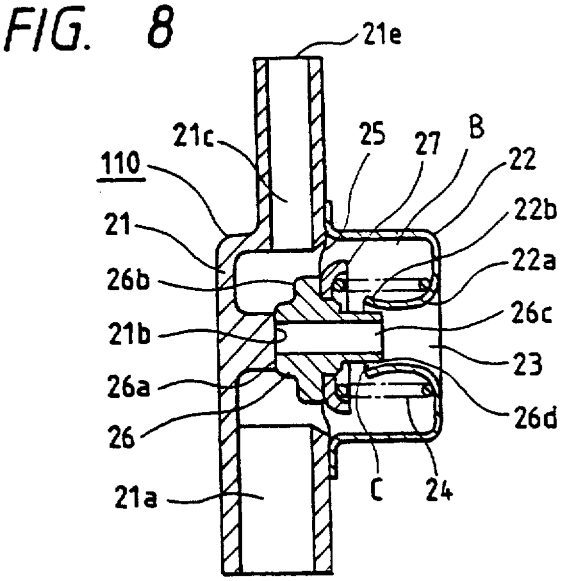
Figure 9:
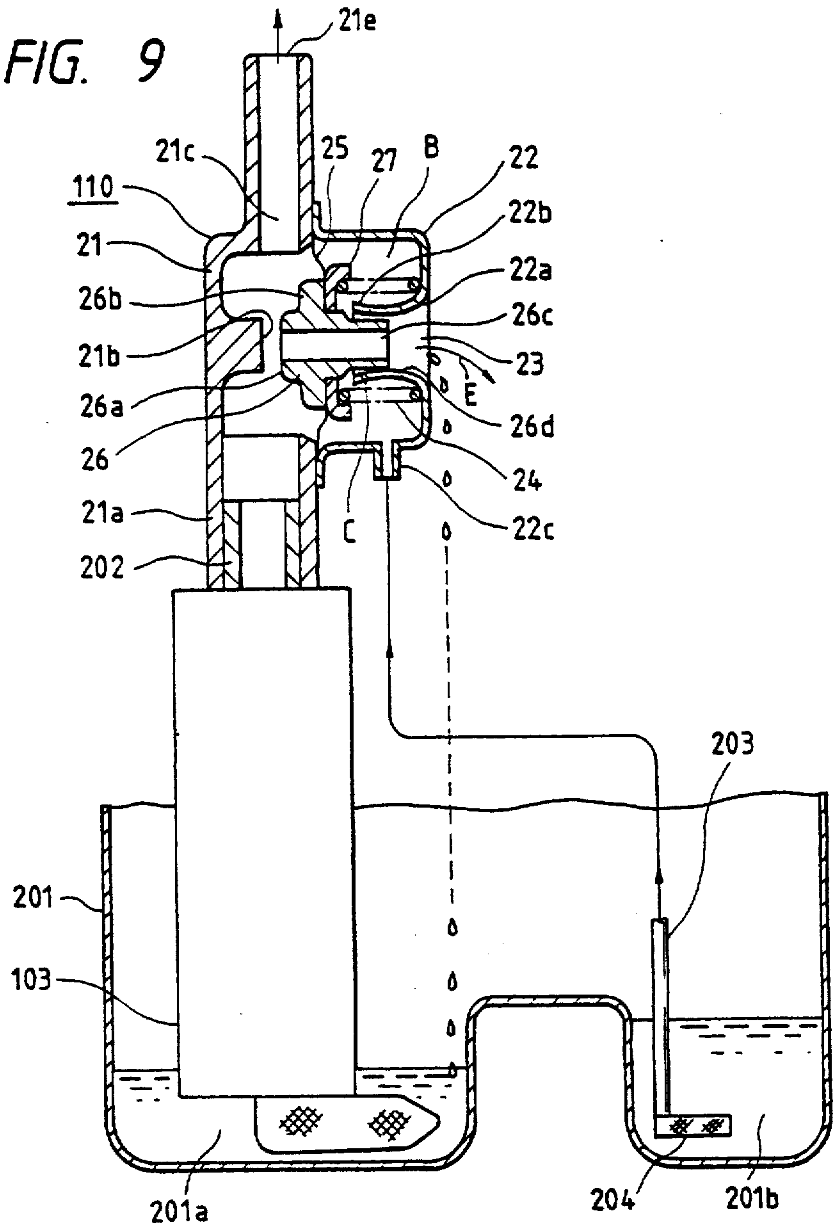

FIG. 1 is a system diagram of a fuel supplying apparatus in accordance with an embodiment of the present invention. The apparatus includes a fuel tank 102 containing fuel 108, a check valve 104, and injectors 106 which are similar to the corresponding parts described above in connection with conventional apparatus shown in FIG. 10. A pressure regulator 110 is also included, the details of which are shown in FIG. 2.

Figure 2:
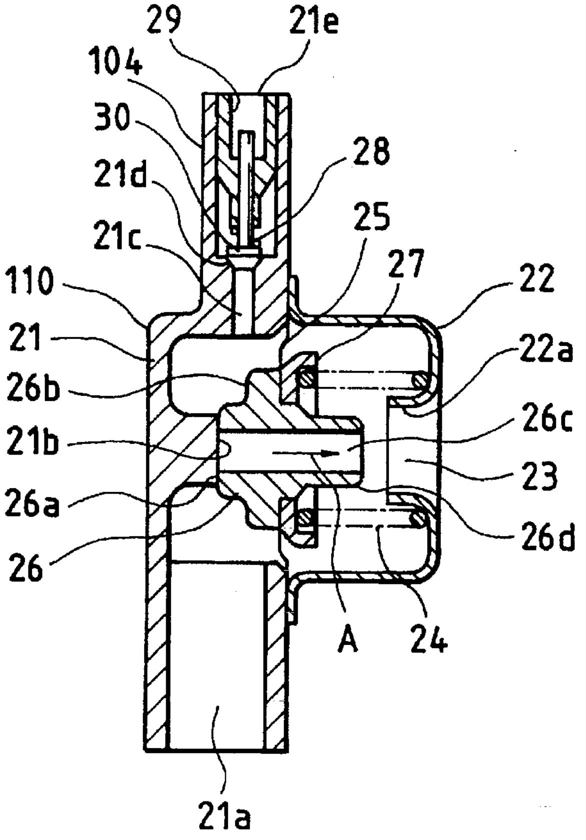
FIG. 2 is a cross-sectional view illustrating a pressure regulator in accordance with the first embodiment.

FIG. 2 is a cross-sectional view of the pressure regulator 110 in accordance with the first embodiment of the present invention, in which the check valve 104 is formed integrally with the pressure regulator shown in FIG. 1. As seen, the pressure regulator 110 is comprised of a case 21 formed of, for instance, a synthetic resin material or a diecast material. The case 21 is formed with an inlet port **21*a*, a valve seat 21*b*, a discharge passage 21*c*, a check valve seat 21*d*, a discharge outlet port 21*e*, In addition, one side of the case 21 is formed with an opening. A hat-shaped cover 22 having a cylindrical portion and an annular flange abutting the case 21 is provided for covering the opening. An inner cylinder 22*a* of the cover is provided in a central portion of the top of the cover 22 and extends inwardly toward the valve seat 21*b*** in a tubular shape.

Also included are an excess fuel passage 23, a pressure regulating spring 24, an elastic diaphragm 25 (called the diaphragm in this embodiment formed of a flexible material such as cloth-inserted synthetic rubber, and a valve element 26. The valve element 26 is formed with a valve **26*a* adapted to abut against the valve seat 21*b*, a diaphragm supporting portion 26b, a discharge passage 26c for excess fuel which is in the form of a through hole, and an outer cylinder 26d extending toward the excess fuel passage 23**.

It should be noted that the contact surfaces of the valve seat 21b and the valve 26a provided on the valve element 26 are parallel or generally parallel with respect to the direction of flow of the fuel flowing in from the fuel inlet port 21a. A spring seat 27 clamps the diaphragm 25 together with the diaphragm supporting portion 26b. A check valve 28 maintains the pressure of the pressure-regulated fluid by abutting against the check valve seat 21d. This check valve 28 is formed of an elastic material such as synthetic rubber or a synthetic resin material, or the like. A spring 30 and a spring guide 29 are also provided.

In the fuel supplying apparatus and the pressure regulator arranged as described above, fuel which has been pressurized by a fuel pump 103 passes through the inlet port 21a, fills the interior of the case 21 pushes open the check valve 28, passes passes through the discharge outlet port 21e, and is supplied to a pressure regulation passage 105.

When the interior of the passage to be pressure-regulated via the pressure regulator 110 from the fuel pump 103 reaches a predetermined pressure set by the pressure regulating spring 24, the valve element 26 moves in the direction of arrow A against the pressure regulating spring 24 in cooperation with the diaphragm 25. As the valve 26a of the valve element 26 moves away from the valve seat 21b of the case 21, the discharge passage 26c for excess fuel passage is opened, thereby allowing the excess fuel to be discharged into the fuel tank 102 through the excess fuel passage 23.

Accordingly, in this embodiment, it becomes unnecessary for the excess fuel from the pressure regulator to pass through a high-temperature section including the engine. Thus, the fuel temperature does not rise, and the amount of bubbles generated is small, thereby enhancing the efficiency of the fuel pump. In addition, when the supply of fuel from the fuel pump 103 under pressure has stopped, the check valve 28 provided in the discharge outlet port 21aabuts against the check valve seat 21d and closes the discharge passage 21c so that the pressure within the pressure regulating passage 105 can be maintained. Also, since the through hole serving as a discharge passage for excess fuel is provided in the valve element 26, the valve element can be made lightweight.

The present invention also makes it possible to improve the response speed of the valve element with respect to the flow of the fuel to be prosecute-regulated during pressure regulation, so that high-accuracy pressure regulation can be effected. Furthermore, single the contact surfaces of the valve seat 21b and the valve 26a provided on the valve element 26 are parallel to the fuel passage, the valve element is not readily subjected to adverse effects such as fluctuations in fuel pressure with respect to the lateral pressure due to the flow of the fuel, thereby making it possible to improve the pressure regulation accuracy.

Second Embodiment

Figure 3:
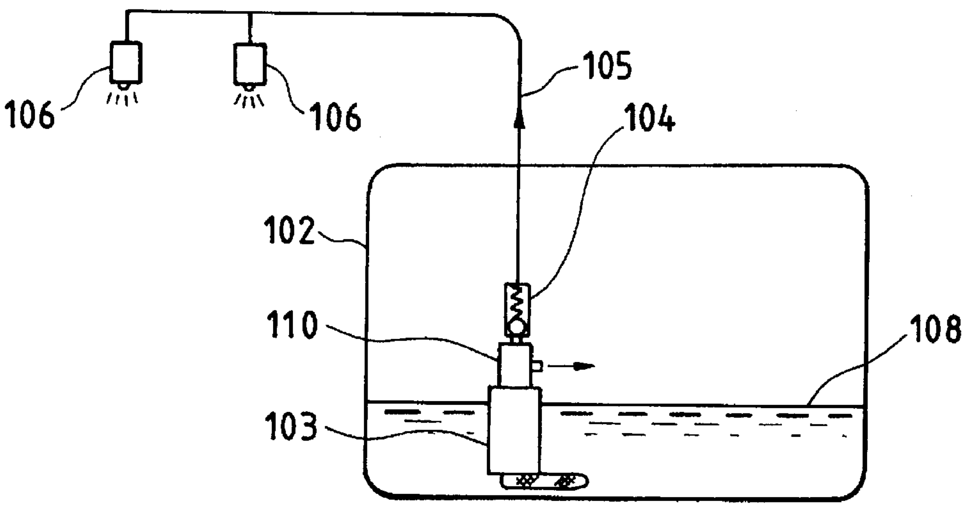
FIG. 3 is a system diagram of a fuel supplying apparatus illustrating a second embodiment of the present invention.
Figure 4:
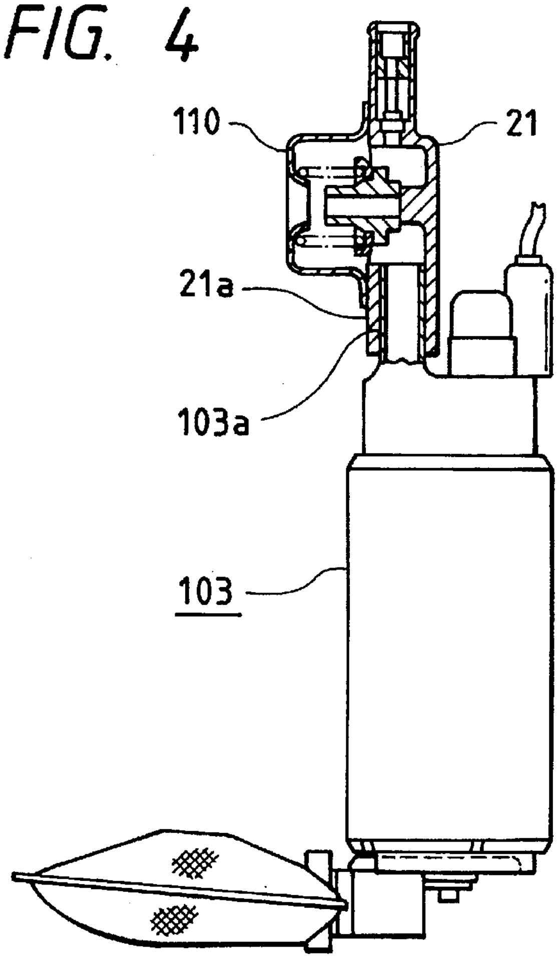
FIG. 4 is a partial cross-sectional view in which the pressure regulator and a fuel pump in accordance with the second embodiment are arranged integrally.

In the above-described embodiment, the fuel supplying apparatus is arranged such that the pressure regulator and the fuel pump are disposed separately. In this second embodiment, the pressure regulator and the fuel pump are arranged integrally, as shown in FIGS. 3 and 4. As shown in FIG. 4, the apparatus includes a pressure regulator 110 similar to the one shown in FIG. 2, for instance. An inlet port 21a for receiving fluid to be pressure-regulated is formed in a case 21. A fuel-discharging outlet port 103a is also provided through which flows fuel pressurized by the fuel pump 103. The outlet port 103a is inserted into the inlet port 21a of the case 21 in a gastight manner. According to this embodiment, the excess fuel from the pressure regulator 110 can be discharged directly into the fuel tank 105, so that the long piping for returning the excess fuel in the conventional fuel supplying apparatus shown in FIG. 10 to the fuel tank 102 becomes unnecessary.

Third Embodiment

Figure 5:
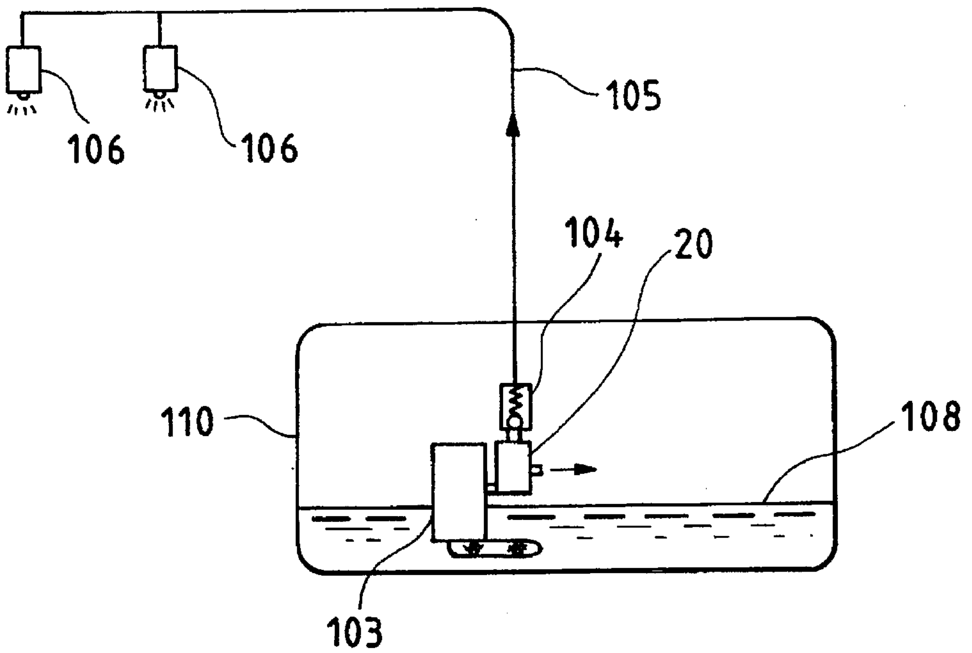
FIG. 5 is a system diagram of a fuel supplying apparatus illustrating a third embodiment of the present invention.
Figure 6:
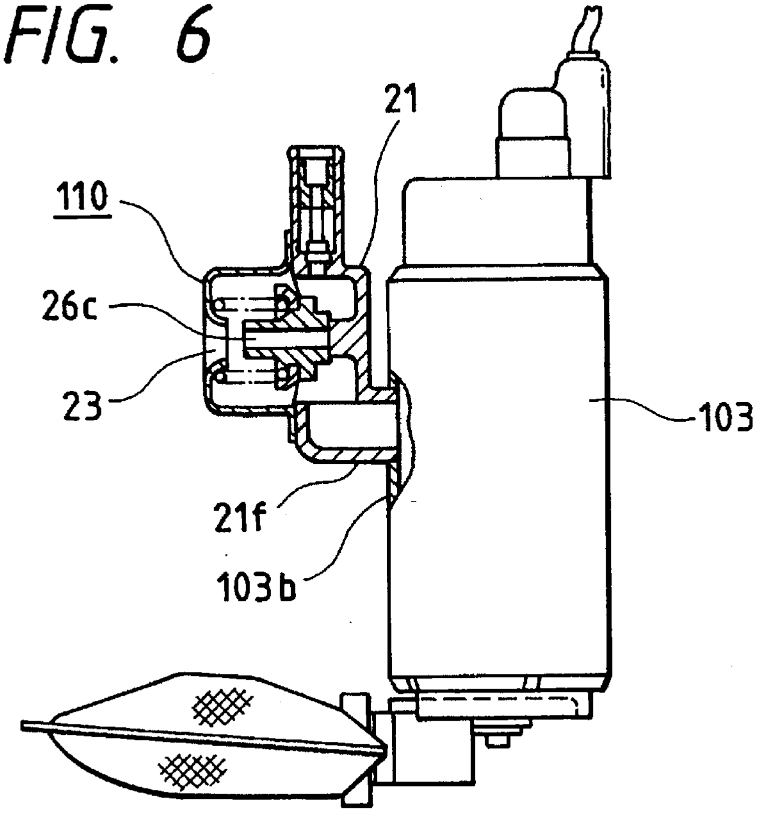
FIG. 6 is a partial cross-sectional view in which the pressure regulator and the fuel pump in accordance with the third embodiment are arranged integrally.

In the second embodiment described above, the pressure regulator and the fuel pump are formed integrally in series in the longitudinal direction. In this third embodiment, the pressure regulator is provided on a side surface of the fuel pump, as shown in FIGS. 5 and 6. As depicted in FIG. 6, a pressure regulator 110 similar to the one shown in FIG. 2, for instance, is provided. The case 21 of the regulator 110 has a suction port 21f. This suction port 21f is fitted on the side surface of the casing 103b of the fuel pump 103. According to this embodiment, even when the pressure regulator is formed integrally with the fuel pump, the overall height can be made low. Thus, the regulator can be installed in a thin-type fuel tank whose height is low, such that the apparatus can be attached to the underside or the like of the trunk compartment of a vehicle.

Fourth Embodiment

Figure 7:
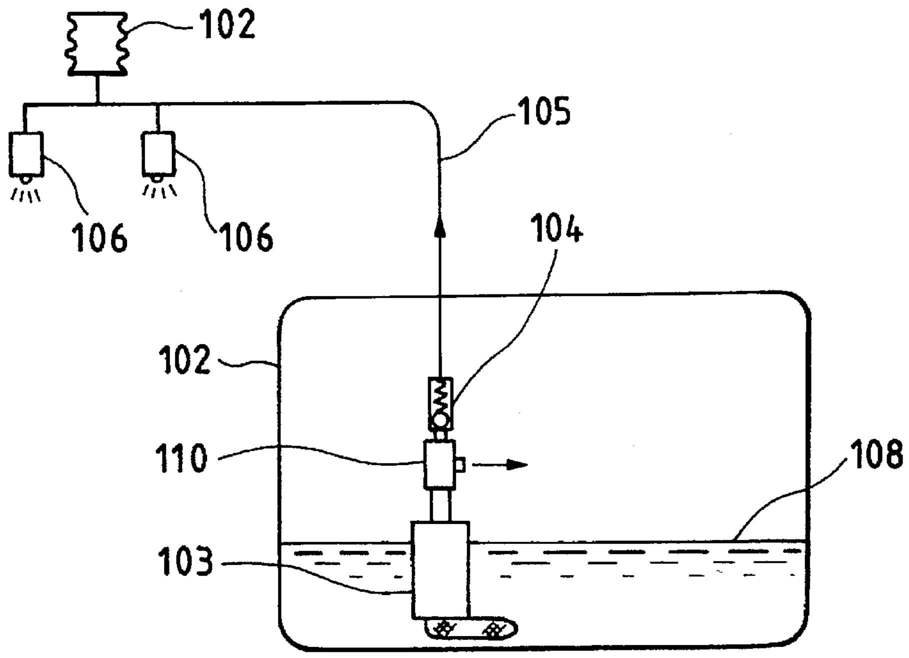
FIG. 7 is a system diagram of a fuel supplying apparatus illustrating a fourth embodiment of the present invention.

FIG. 7 is a schematic illustration of a fuel supplying apparatus in accordance with another embodiment of the present invention. As seen in the drawing figure, the apparatus includes a fuel tank 102 which contains fuel 108, a check valve 104, an injector 106 and a pressure regulator 110, all of which are generally similar to the corresponding features of the fuel supplying apparatus of the first embodiment. An auxiliary pressure device 109 is also provided and is formed of an elastic material such as a bellows-shaped metal bellows, or a bellows made of synthetic rubber. The auxiliary pressure device 109 is installed in the pressure regulation passage 105, i.e., a fuel supplying passage, in the vicinity of an injector 106 for an internal combustion engine. It should be noted that a plurality of auxiliary pressure devices 109 may be provided.

According to this embodiment, when the amount of fuel consumption by the engine increases, and a large amount of fuel is injected from the injector 106 into the engine, the fuel pressure at the inlet port of the injector 106 declines suddenly. The pressure accumulated in the auxiliary pressure device operates at this time and prevents a decline in the pressure at the inlet port of the injector 106, thereby effecting proper fuel supply to the engine.

Fifth Embodiment

Figure 8:
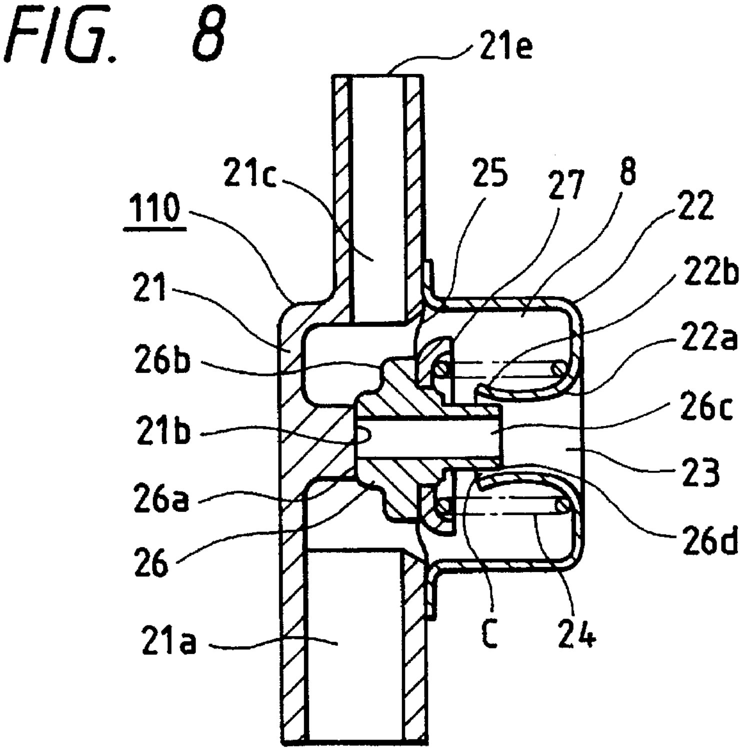
FIG. 8 is a cross-sectional view of the pressure regulator illustrating a fifth embodiment of the present invention.

In a fifth embodiment shown in FIG. 8, the cover 22 is illustrated as having a tubular inner cylinder 22a that extends generally axially inwardly towards the interior of the cover 22 defined by the outer cylindrical portion. As can be seen, the end 22b of the tubular inner cylinder 22a is formed in the shape of a trumpet. This end 22b of the inner cylinder 22a is engaged with or encircles the outer cylinder 26d of the discharge passage 26c provided in the valve element 26, with a very small movable or variable gap C therebetween. Thus, the tubular inner cylinder 22a in the cover 22 and the outer cylinder 26d of the discharge passage 26c are generally coaxial and overlap one another for a portion of the axial extent. The basic arrangement and operation are similar to those described in connection with FIG. 2. In the system in which the pressure is regulated to a predetermined pressure by the pressure regulating spring 24, if the amount of excess fuel is large, it is necessary to enlarge the area of the opening at the inlet portion of the discharge passage 26c for excess fuel in the valve element 26. Accordingly, the pressure regulating spring 24 is compressed and the area of the opening is enlarged, so that the regulated pressure becomes high.

In this embodiment, to make it possible to cope with high regulated pressures, the end **22*b* of the tubular inner cylinder 22*a* provided in the cover 22 is made in the shape of a trumpet, and the outer cylinder 26*d* of the valve element 26 is inserted into the inner cylinder 22*a* with the very small movable or variable gap C. As a result when excess fuel flows through the excess fuel passage 23, a Venturi effect occurs at the gap C between the outer cylinder 26*d* at the downstream end of the valve element 26 and the trumpet-shaped end 22*b* of the inner cylinder 22*a* of the cover since the spring chamber B in the cover 22 is made as a gastight chamber, negative pressure can be generated in the spring chamber B if the gap C at the engaging portions of the downstream outer cylinder 26*d* of the valve element 26 and the inner cylinder 22*a*** of the cover is adjusted such that negative pressure is produced in correspondence with the increased pressure portion occurring when the amount of excess fuel has increased, it is possible to vary the amount of negative pressure produced due to the Venturi effect occurring as a result of the flow of excess fuel. Thus, the pressure regulation accuracy can be improved by increasing the amount of pressure regulation.

That is, if the amount of excess fuel has increased, the area of the opening at the inlet portion of the discharge passage **26*c* for excess fuel in the diaphragm support 26 can be enlarged even if the regulated pressure does not become high since the negative pressure occurs in the spring chamber B in the cover 22**. Thus, it is possible to discharge a large amount of excess fuel with the same pressure.

Sixth Embodiment

Figure 9:
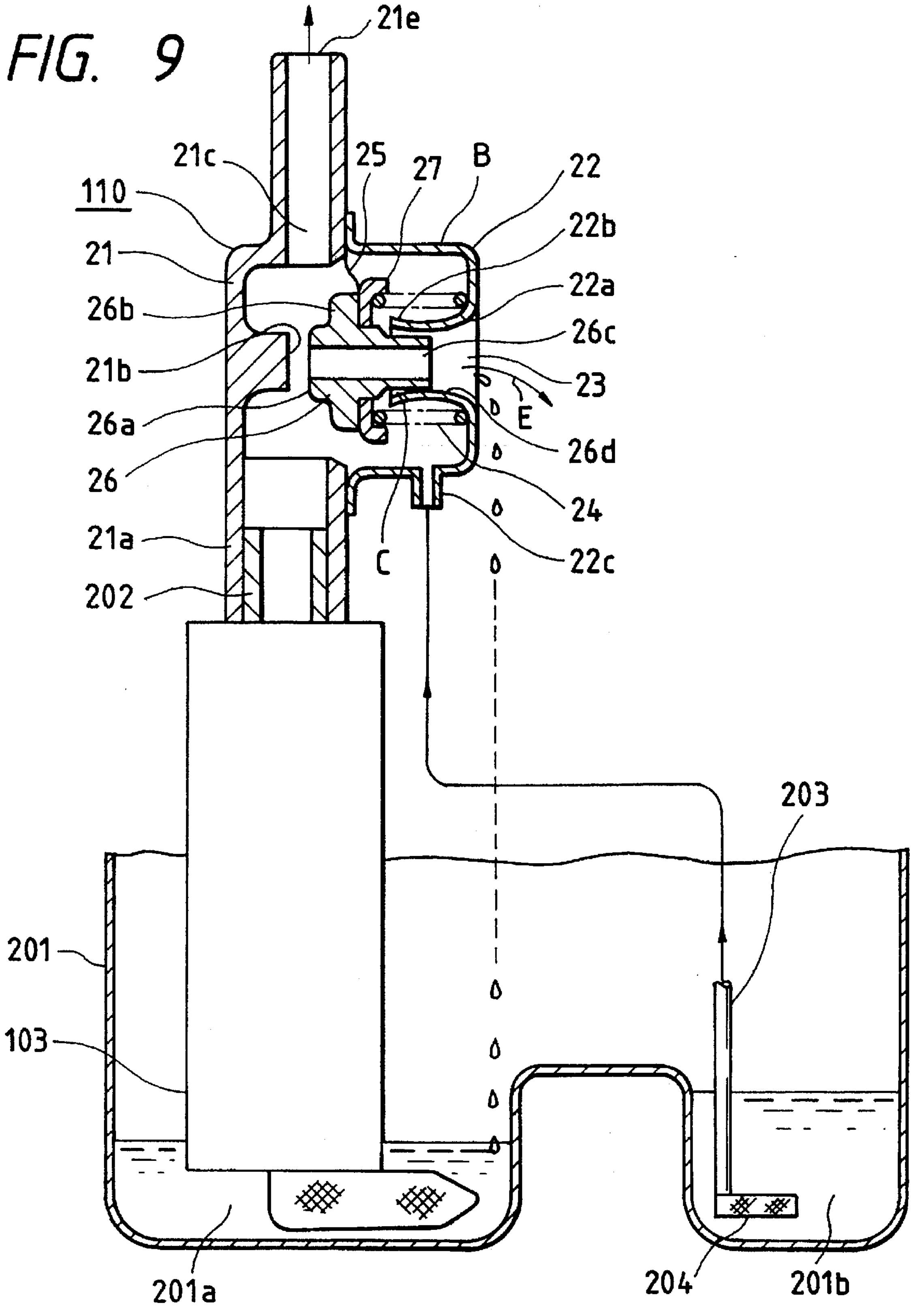
FIG. 9 is a system diagram of a fuel supplying apparatus illustrating a sixth embodiment of the present invention.

FIG. 9 shows a sixth embodiment of the present invention. As illustrated, the bottom of a two-tank type fuel tank 201 has two recessed portions situated on either side of an upstanding ridge. Thus, the tank 201 is separated into two tanks or two tank chambers. The fuel tank 201 has a first tank chamber **201*a* and a second tank chamber 201*b*. When the amount of fuel remaining in the fuel tank has become small, the structure of the tank is such fuel remains separately in the first tank chamber 201*a* and the second tank chamber 201*b***.

A fuel pump 103 and a pressure regulator 110 similar to the ones shown in FIG. 8, for example, are also included. This pressure regulator 110 has a suction pipe **22*c* communicating with the spring chamber B of the cover 22 and is installed in the two-tank type fuel tank 201 integrally with the fuel pump 103. Except for the suction pipe 22*c*, the pressure regulator 110 is similar to the one shown in the fifth embodiment, so a detailed description of the regulator 110** is not repeated here.

A discharge pipe 202 is located in the inlet port **21*a*. Also, a capillary tube 203 has one end connected to the suction pipe 22*c* of the pressure regulator 110 and the other end immersed in the fuel tank 201 on the second tank chamber 201*b* side via a fuel filter 204**.

In the fuel supplying apparatus arranged as described above, the fuel which is discharged from the fuel pump 103 is supplied to the pressure regulator 110 via the discharge pipe 202, where the fuel is subjected to pressure regulation in a fixed range of pressure, and the fuel is then supplied to the engine (not shown). In addition, the excess fuel subjected to pressure regulation by the pressure regulator 110 passes through the excess fuel passage 23, is discharged in the direction of arrow E, and is discharged to the first tank chamber **201*a*** side.

As described above with respect to the structure and operation of the fifth embodiment of the pressure regulator shown in FIG. 8, if the end **22*b* of the tubular inner cylinder 22*a* provided in the cover 22 is formed in the shape of a trumpet, when the excess fuel flows through the excess fuel passage 23, negative pressure is generated in the spring chamber B of the cower 22 due to the Venturi effect. If this negative pressure becomes large, the fuel can be sucked from the second tank chamber 201*b* side via the suction pipe 22*c* and the capillary tube 203. As a result, the fuel can be transferred from the excess fuel passage 23 to the fuel tank on the first tank chamber 201*a*** side.

Since the present invention is arranged and constructed as described above, at least the following advantages are realized and achieved.

The pressure regulator is provided between the fuel pump disposed in the fuel tank and the check valve for preventing the reverse flow of fuel from the internal combustion engine. Thus, when the engine is stopped and the fuel supply from the fuel pump ceases, it is possible to maintain the fuel pressure between the pressure regulator and the injector, thereby improving the engine starting characteristics. In addition, the excess fuel from the pressure regulator can be returned to the fuel tank without passing through a high-temperature section including the engine. Thus, the fuel temperature in the fuel tank is not increased, and the amount of bubbles produced is not excessive. Hence, it is possible to improve the efficiency of the fuel pump.

In addition, if the pressure regulator is mounted integrally with the fuel pump immersed in the fuel tank, it is possible to eliminate a conventionally required return pipe for returning the excess fuel from the pressure regulator disposed in the engine compartment to the fuel tank.

Also, if the pressure regulator is juxtaposed to the side surface of the fuel pump provided in the fuel tank, installation becomes possible in a vehicle having a thin-type fuel tank whose height is low. Consequently, the apparatus can be advantageously attached to the underside or the like of the trunk compartment of the vehicle.

In addition, by installing an auxiliary pressure device in the fuel supplying passage in the vicinity of the internal combustion engine, it is possible to compensate for a sudden decline in pressure when the amount of fuel consumption by the internal combustion engine has increased and a large amount of fuel has been injected into the engine from the injector.

Moreover, the construction is such that the valve seat, the exhaust passage for excess fuel, the pressure regulating spring for pressing the valve element against the valve seat with a predetermined pressure, and the elastic diaphragm are all held in the case by maintaining gastightness, and a cover for receiving and supporting the pressure regulating spring is provided. Accordingly, the valve element can made lightweight, and it is possible to improve the response speed of the valve element with respect to the flow of fuel to be pressure-regulated during pressure regulation so that high-accuracy pressure regulation can be effected.

In addition, the arrangement provided is such that the spring chamber is formed between the elastic diaphragm and the cover, the pressure regulating spring is received and supported around the inner cylinder of the cover extending toward the valve seat, and the inner cylinder of the cover and the outer cylinder of the exhaust passage are positioned so that one overlies the other with a movable or variable gap (i.e., they are generally coaxial and overlap one another for at least a portion of their axial extent). Accordingly, the spring chamber of the cover is set under negative pressure by causing jet pump action to occur due to the Venturi effect between the inner cylinder of the cover and the outer cylinder of the discharge passage. By way of this negative pressure, the valve element operates in the direction in which the pressure regulating spring is pressed so as to increase the gap between the valve seat and the valve element. Thus, the discharge of excess fuel is facilitated and the burden on the fuel pump is alleviated.

Furthermore, since the contact surfaces of the valve seat and the valve located in the fuel passage are formed to be parallel with the fuel passage, the valve element is not subjected to adverse effects with respect to the lateral pressure associated with the flow of fuel supplied from the fuel pump under pressure. Thus, it is possible to improve the pressure regulation accuracy.

Further yet, when the pressure regulator is installed in a fuel tank separated into two tanks, if a capillary tube is provided whose distal end extends to the tank on the side where the fuel pump is not installed, and which communicates with the spring chamber formed by the cover of the pressure regulator, it is possible to transfer fuel from the tank where the fuel pump is not installed to the tank where the fuel pump is installed, by making use of the negative pressure occurring in the spring chamber due to the flow of excess fuel. Thus, it is possible to suck the fuel in the two tanks by one fuel pump.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes, may be made by others, and equivalents employed, without departing from the spirit of the present invention. Accordingly, it is expressly intended that all such variations, changes and equivalents which fall within the spirit and scope of the present invention as defined in the claims, be embraced thereby,

What is claimed is:

1. A fuel supplying apparatus for supplying fuel from a fuel pump disposed in a fuel tank to an internal combustion engine by way of a fuel supplying passage, comprising a check valve positioned in the fuel supplying passage between said internal combustion engine and said fuel pump for preventing a reverse flow of fuel, and a pressure regulator disposed in the fuel supplying passage between the check valve and the fuel pump for regulating the pressure of fuel being supplied, said pressure regulator including a case in which is positioned a movable valve element and an excess fuel passage communicating with the case through which excess fuel is discharged into the tank when the pressure in the pressure regulator exceeds a predetermined value, said movable valve element being provided with a fuel discharge passage, said valve element being movable between one position in which the valve element engages a valve seat to prevent the flow of fuel to the excess fuel passage when the pressure in the pressure regulator is less than the predetermined pressure and another position in which the valve element is spaced from the valve seat to permit excess fuel to flow through the fuel discharge passage and to the excess fuel passage for being discharged into the fuel tank when the pressure in the pressure regulator exceeds the predetermined pressure.

2. A fuel supplying apparatus according to claim 1, wherein said pressure regulator is integrally attached to said fuel pump.

3. A fuel supplying apparatus according to claim 2, wherein said pressure regulator is attached to a side of said fuel pump.

4. A fuel supplying apparatus according to claim 3, including an auxiliary pressure device disposed in the fuel supplying passage adjacent the internal combustion for compensating for a decline in fuel pressure in the fuel supplying passage.

5. A fuel supplying apparatus according to claim 1, including an auxiliary pressure device disposed in the fuel supplying passage adjacent the internal combustion for compensating for a decline in fuel pressure in the fuel supplying passage.

6. A pressure regulator comprising:

a case having a fuel inlet port for receiving fuel from a fuel pump, a fuel outlet port for directing fuel to an internal combustion engine, an opening, and an elastic diaphragm extending across the opening to define an interior of the case and an exterior;

a valve element attached to the elastic diaphragm, said valve element having a discharge passage for discharging excess fuel by allowing the interior of the case to communicate with the exterior;

a spring seat provided in said case in face-to-face relation to said valve element to close the discharge passage of said valve element during pressure contact of said valve element; and a spring for urging said valve element into pressure contact with said valve seat with predetermined pressure.

7. A pressure regulator according to claim 6, including a fuel passage extending between said fuel inlet port and said fuel outlet port, and wherein contact surfaces of said valve element and said valve seat are substantially parallel with said fuel passage.

8. A pressure regulator comprising: a case including a fuel inlet port for receiving fuel from a fuel pump, a fuel outlet port through which fuel flows to an engine, an opening, and an elastic diaphragm extending across the opening to define an interior of the casing and an exterior;

a valve element attached to the elastic diaphragm, said valve element having an outer cylinder in which is located a passage for allowing the interior of said case to communicate with the exterior so as to discharge excess fuel;

a spring seat provided in said case in face-to face relation to said valve element to close the discharge passage of said valve element during pressure contact of said value element;

a spring for urging said valve element into pressure contact with said valve seat with a predetermined pressure; and a cover attached to the case to cover an outer side of said opening of said case, said cover including an outer cylindrical portion defining an interior of the cover and an end from which extends an inner cylinder that opens to the interior, said outer cylinder of said valve element being positioned in said inner cylinder of said cover with a gap formed between the inner cylinder and the outer cylinder.

9. A pressure regulator according to claim 8, wherein said valve element and said valve seat include contact surfaces that contact one another the contact surfaces of said valve element and said valve seat being substantially parallel with a fuel passage extending between the fuel inlet port to the fuel outlet port.

10. A pressure regulator according to claim 8, wherein said fuel pump is installed in a fuel tank at least a portion of which is separated into two tank portions, said fuel pump being located in one of the two tank portions, the other fuel tank portion and the interior of said cover being in communication with each other by a capillary tube.

11. A pressure regulator according to claim 8, including a capillary tube communicating with the interior of the cover.

12. A fuel supplying apparatus according to claim 1, including a diaphragm connected to the movable valve element.

13. A fuel supplying apparatus according to claim 1 wherein the pressure regulator includes a case and a cover secured to the case to cover an opening in the case, said excess fuel passage being formed in the cover.

* * * * *

UNITED STATES PATENT AND TRADEMARK OFFICE

CERTIFICATE OF CORRECTION

PATENT NO. : 5,655,504

DATED : August 12, 1997

INVENTOR(S) : Shingo IWAI

It is certified that error appears in the above-indentified patent and that said Letters Patent is hereby corrected as shown below:

In Fig. 7: change reference numeral "102" in the upper left-hand corner to --109--.

In Fig. 8: change reference numeral "8" to --B--.

In Fig. 9: extend the lead line for reference character "B".

In Fig. 9: illustrate the lower half of the diaphragm "25".

Signed and Sealed this

Tenth Day of February, 1998

Attest:

BRUCE LEHMAN

Attesting Officer

*Commissioner of Patents and Trademarks*